United States Patent
Kernes

(10) Patent No.: US 10,414,462 B2
(45) Date of Patent: Sep. 17, 2019

(54) MOTORCYCLE HITCH ASSEMBLY

(71) Applicant: Toni Kernes, Abilene, TX (US)

(72) Inventor: Toni Kernes, Abilene, TX (US)

( * ) Notice: Subject to any disclaimer, the term of this patent is extended or adjusted under 35 U.S.C. 154(b) by 325 days.

(21) Appl. No.: 15/237,279

(22) Filed: Aug. 15, 2016

(65) Prior Publication Data

US 2018/0043963 A1 Feb. 15, 2018

(51) Int. Cl.
*B62K 27/12* (2006.01)
*B60D 1/00* (2006.01)

(52) U.S. Cl.
CPC ........ *B62K 27/12* (2013.01); *B60D 2001/003* (2013.01)

(58) Field of Classification Search
CPC .......................... B60D 2001/003; B62K 27/12
USPC ......................................................... 280/513
See application file for complete search history.

(56) References Cited

U.S. PATENT DOCUMENTS

| | | | |
|---|---|---|---|
| 2,212,958 A | 8/1940 | Rea | |
| 2,878,036 A * | 3/1959 | Simmons | ................ B60D 1/50 280/485 |
| D243,166 S | 1/1977 | Jones | |
| 4,274,649 A | 6/1981 | Vanderhorst et al. | |
| D273,486 S | 4/1984 | O'Rourke | |
| 4,536,001 A * | 8/1985 | Wagner | ................ B62D 63/064 280/204 |
| D294,341 S | 2/1988 | Van Komen | |
| D298,022 S | 10/1988 | O'Rourke | |
| 4,863,185 A | 9/1989 | Coppe | |
| 4,889,356 A * | 12/1989 | Morris | ..................... B60D 1/07 280/416.1 |
| 5,169,168 A * | 12/1992 | Harry | ...................... B60D 1/06 280/511 |
| 5,395,131 A | 3/1995 | Herrick | |
| 6,171,012 B1 | 1/2001 | Westphal | |
| 6,241,271 B1 | 6/2001 | Belinky | |
| 6,412,570 B1 * | 7/2002 | Pruitt | ................... A01B 59/042 172/449 |
| 6,454,289 B1 | 9/2002 | Mullins | |
| 7,988,178 B2 | 8/2011 | Shockley et al. | |
| 2002/0096859 A1 | 7/2002 | Versaw | |
| 2017/0342681 A1 * | 11/2017 | Pascual | ................... E02F 9/006 |

FOREIGN PATENT DOCUMENTS

GB 2061438 A * 5/1981 ............. F16B 21/12

* cited by examiner

*Primary Examiner* — Joseph M Rocca
*Assistant Examiner* — Felicia L. Brittman
(74) *Attorney, Agent, or Firm* — Suzanne Kikel

(57) ABSTRACT

A motorcycle hitch assembly couples a motorcycle to a trailer allowing the motorcycle to easily turn a corner. A yoke assembly connected to the motorcycle has a kingpin and a cotter-pin. A tow hitch assembly is mounted to the trailer and has an elongated towing arm with a circular socket with an inner spherical surface and a radial ball mounted on and secured to the kingpin by the cotter pin. The radial ball is supported in the circular socket of the elongated towing arm and has an outer spherical surface engaging the inner spherical surface of the circular socket for rotational movement of the radial ball about the kingpin to allow free movement of the motorcycle in various planes while maintaining the trailer in a fixed plane. The circular socket is a one piece construction or a two piece construction.

16 Claims, 5 Drawing Sheets

MOTORCYCLE HITCH ASSEMBLY

BACKGROUND OF THE INVENTION

1. Technical Field of the Invention

The present invention relates to a towing device for hitching or connecting a trailer to a motorcycle, and more particularly, to the structure of a motorcycle hitch assembly for connecting the motorcycle to a trailer in a manner which allows the motorcycle to easily turn a corner or lean from side to side while pulling the trailer which remains in a relatively fixed plane relative to the ground.

2. Brief Description of the Prior Art

A motorcycle owner may need to transport a motorcycle that is disabled, or intended only for racing, show, or other special purposes, or simply because the owner wants to take the motorcycle along on a journey but requires a vehicle with more carrying capacity. A motorcycle might then be loaded onto a sufficiently large pickup truck or flatbed truck. However, the loading operation of the motorcycle onto the truck may be difficult; the motorcycle may generally consume a significant portion of the carrying capacity of the truck; and/or such a truck may be unavailable or impractical.

Towing or hitching assemblies are used in a variety of situations where a towing vehicle, such as, for example, a motorcycle, pulls a towed vehicle, such as, for example, a trailer behind it. When the vehicle travels over uneven ground the towed vehicle often becomes disoriented with respect to the towing vehicle about a roll axis, a pitch axis, and/or a yaw axis. It is therefore desirable to have a towing or hitch assembly which allows pivoting of the motorcycle about these axes while the trailer remains on the ground without any binding of the motorcycle hitch assembly.

There is, therefore, a need in the art to provide a towing or hitch assembly which allows pivoting of the motorcycle about several axes while the trailer remains in a fixed plane and on the ground without any binding of the motorcycle hitch assembly.

There is a further need in the art to provide a trailer hitch assembly for hitching a conventional trailer to a motorcycle and the like which accommodates the turning, cornering, and/or leaning of the motorcycle in various directions while towing the trailer.

There is still a further need in the art for a strong, rugged and safe hitch assembly which will also handle any rotational motion between the motorcycle and the trailer.

There is still a further need in the art for a suitable hitch assembly which easily attaches and detaches a trailer to the motorcycle for cross-country trailering.

And yet, there is still a need in the art to provide a suitable motorcycle hitch assembly which allows pivoting of the motorcycle relative to the trailer at an angle of as much as 90 degrees without any binding of the motorcycle hitch assembly.

SUMMARY OF THE INVENTION

The present invention meets the above needs. The motorcycle hitch assembly of the invention allows easily coupling and uncoupling of a trailer relative to a motorcycle. The construction of the motorcycle hitch assembly allows the motorcycle to easily turn a corner, i.e. where the trailer and motorcycle may be as much as 90 degrees at an angle relative to each other, or which allows the motorcycle to easily lean to one side or the other while the trailer remains in a fixed horizontal plane relative to the road or ground.

More specifically, the motorcycle hitch assembly of the invention comprises a yoke assembly secured to a motorcycle and a tow hitch assembly secured to the trailer. The yoke assembly comprises a mounting plate; an elongated kingpin secured to the mounting plate; a cotter-pin arrangement received in an aperture of the kingpin; and a mounting nut arrangement for securing the elongated kingpin to the mounting plate of the yoke assembly.

The tow hitch assembly is mounted to the trailer and comprises a sleeve bolted to the trailer; an elongated towing arm connected to the sleeve and having a circular socket with an inner spherical surface; and a radial ball mounted on the elongated kingpin of the yoke assembly and fixedly secured to the elongated kingpin by the cotter-pin arrangement. The radial ball is supported in the circular socket of the elongated towing arm and has an outer spherical surface corresponding to and in engagement with the inner spherical surface of the circular socket of the elongated towing arm to allow rotation of the radial ball in the circular socket and free movement of the yoke assembly and therefore the motorcycle in various planes while maintaining the trailer in a fixed plane.

In an embodiment of the invention, the cotter-pin arrangement includes a cotter-pin and a semi-circular hoop member having a relatively straight surface for securely locking the radial ball onto the kingpin. In an embodiment of the invention, the elongated towing arm comprises a one-piece member forming the circular socket. In a further embodiment of the invention, the elongated towing arm comprises at least two members bolted together to form the circular socket.

The motorcycle hitch assembly of the invention allows the motorcycle to freely move in a plurality of planes, including a pitch plane, a yaw plane and a roll plane, or a combination thereof, with respect to the trailer while the trailer remains in a relatively straight plane.

The present invention overcomes the mechanical limitations in existing hitching devices for motorcycles and provides a device capable of handling any leaning or cornering movement of the motorcycle, while at the same time being fully capable of handling all forces created in pulling a large load. The motorcycle hitch assembly of the invention may be highly desirable for a land-roving vehicle when engaged in cross-country trailering. An advantage of the assembly of the invention is that it is quickly attachable to and releasable from the trailer while permitting a wide range of angular variations in the vertical and horizontal planes between the motorcycle and the trailer.

In broad terms, the present invention provides a radial ball and socket assembly supported by a tow hitch assembly of a trailer and a kingpin assembly supported by a yoke assembly of a motorcycle. The radial ball has an axial aperture. In operation for connecting the tow hitch assembly to the trailer, the radial ball and socket assembly of the tow hitch assembly is raised upwardly to position the axial aperture of the ball in line with the kingpin assembly supported by the yoke assembly. The radial ball is then slide down along the kingpin so as to secure the tow hitch assembly of the trailer to the yoke assembly of the motorcycle. The radial ball is then secured to the kingpin via a cotter pin arrangement which is received in an aperture located in the upper portion of the kingpin.

These and other features and advantages of the present invention will be better appreciated and understood when the following description is read in light of the accompany drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
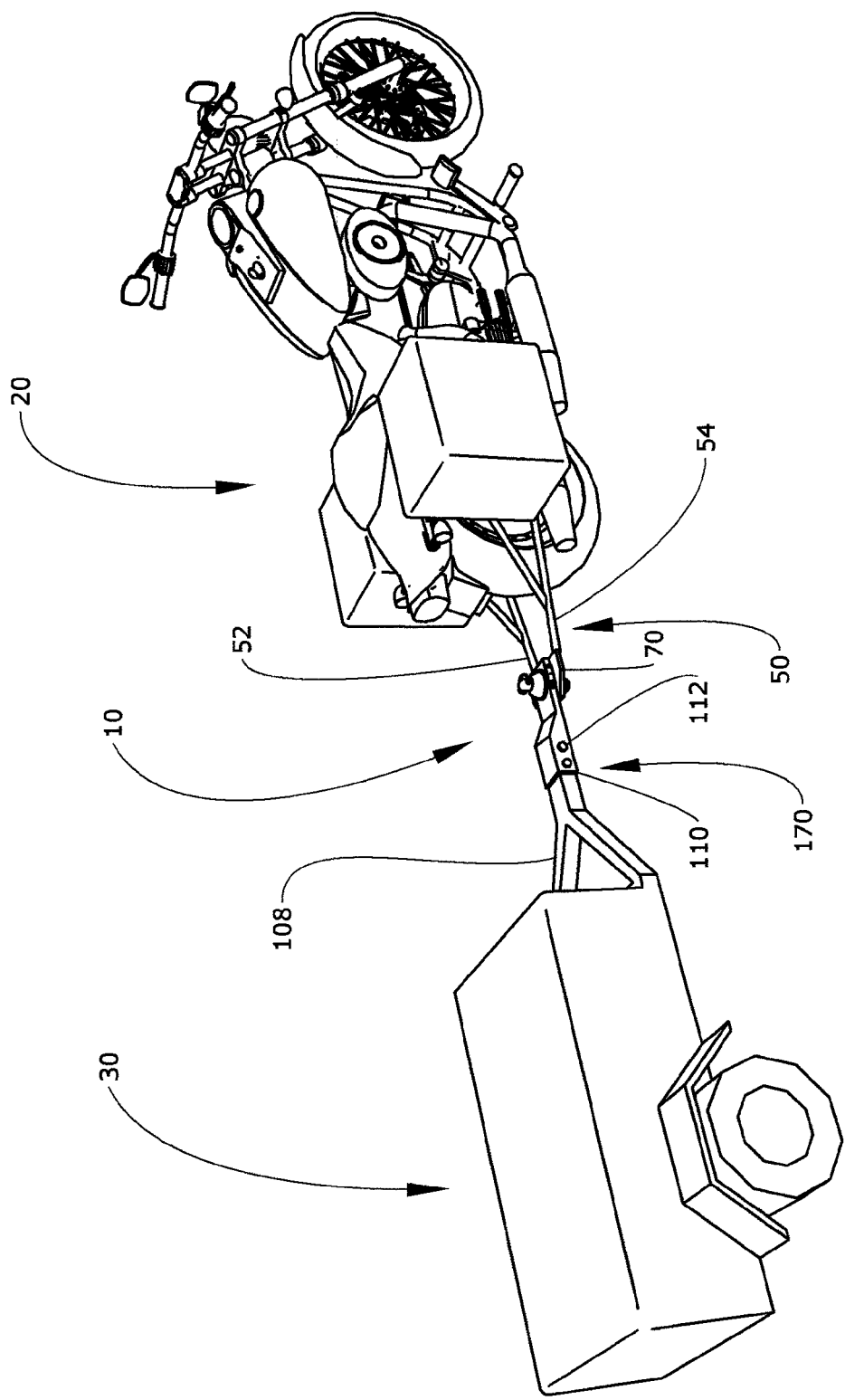
FIG. 1 is a perspective elevation view illustrating a motorcycle towing a trailer using a motorcycle hitch assembly of the invention.

Referring to the drawings, the invention will now be described in more detail.

FIG. 1 illustrates a motorcycle hitch assembly 10 for connecting a motorcycle 20 to a trailer 30. Motorcycle hitch assembly 10 comprises a yoke assembly 50 having spaced-apart legs 52, 54 connected to motorcycle 20 through suitable means not shown but known to those skilled in the art; and a tow hitch assembly 170 mounted to the trailer 30, more about which is discussed herein below.

Figure 2:
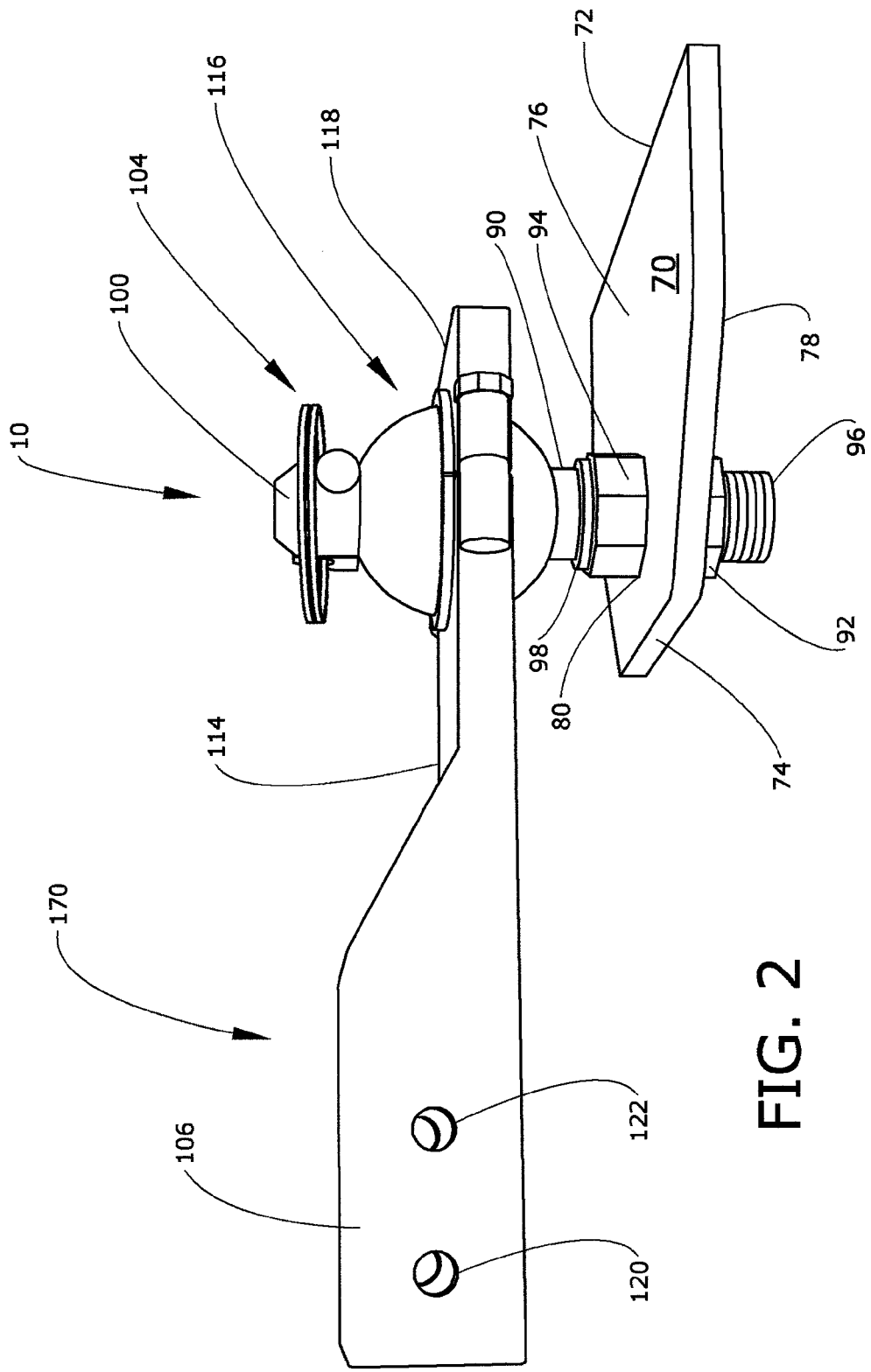
FIG. 2 is an enlarged, perspective view of the motorcycle hitch assembly of FIG. 1.
Figure 3:
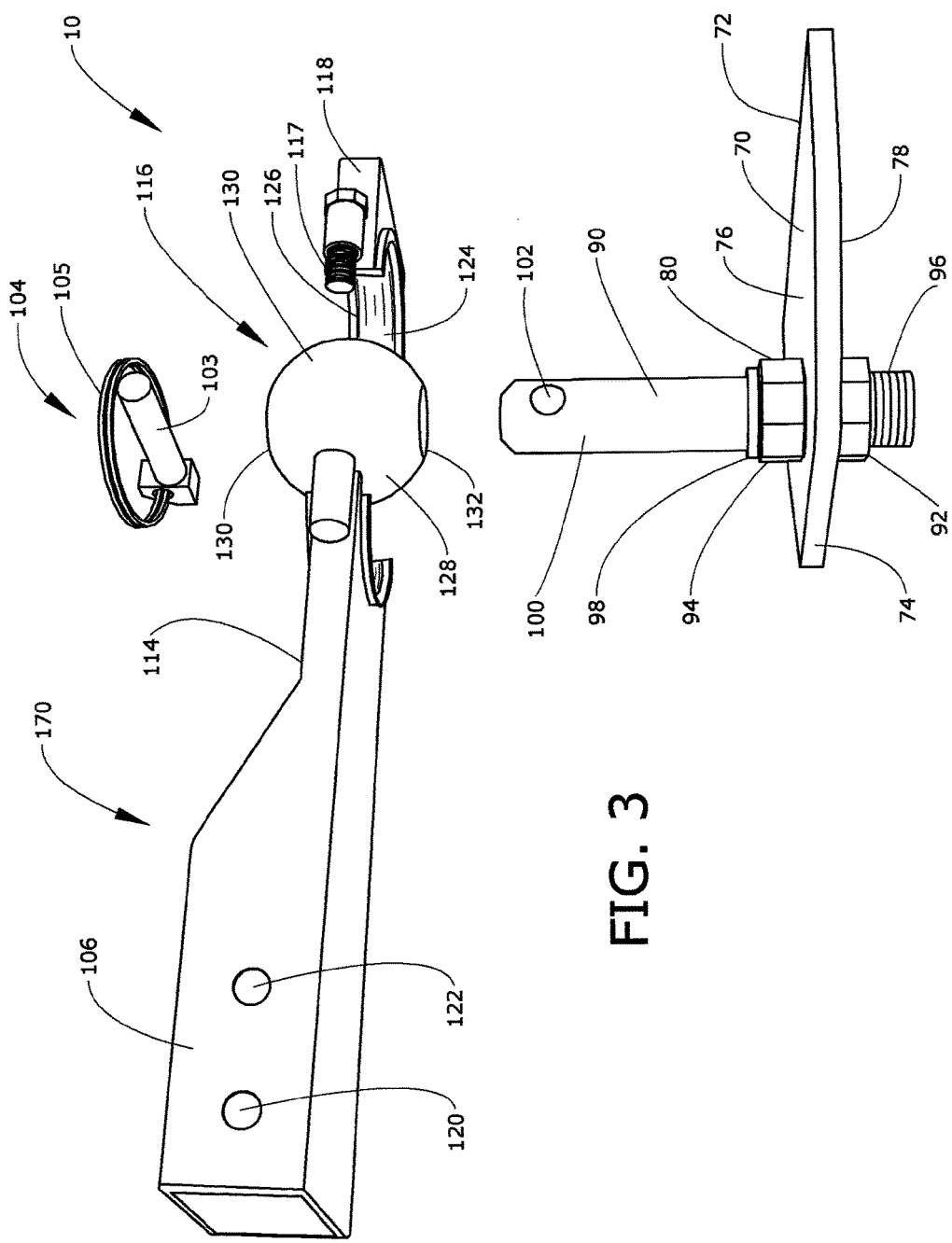
FIG. 3 is an exploded perspective view of the motorcycle hitch assembly of FIG. 2.

Referring to FIGS. 2 and 3, yoke assembly 50 comprises a mounting plate 70 to which supports legs 52, 54 (FIG. 1) are attached through suitable means. As clearly shown in FIG. 2, mounting plate 70 has a first end 72, a second end 74, an upper surface 76, a lower surface 78 and an aperture 80 extending through the thickness of mounting plate 70 from the upper surface 76 to the lower surface 78. Yoke assembly 50 further comprises a kingpin 90 which extends in aperture 80 of mounting plate 70 in in upward fashion. Kingpin 90 is mounted in mounting plate 90 via a mounting nut assembly comprising a first mounting nut 92 and a second mounting nut 94. First mounting nut 92 is threadably secured to the threads of the first portion 96 of the elongated kingpin 90 and abuts against the lower surface 78 of the mounting plate 70. Second mounting nut 94 is threadably secured to the threads of the first portion 96 of the elongated kingpin 90 and abuts against the upper surface 76 of mounting plate 70. A washer element 98 is arranged against second mounting nut 94.

As best shown in FIG. 3, kingpin 90 has a second or upper portion 100 with an aperture 102 extending along a transverse axis of kingpin 90, which receives a cotter-pin arrangement 104 which has a leg 103 and a hoop 105, more about which is discussed herein below. Upper portion 100 of kingpin has a smooth outer surface whereas the first portion 96 of elongated kingpin 90. The first mounting nut 92 and the second mounting nut 94 are arranged to securely affix the elongated kingpin 90 in mounting plate 70 and to extend the upper portion 100 of the elongated kingpin 90 upwardly from the mounting plate 70.

Referring again to FIGS. 2 and 3, tow hitch assembly 170 is mounted to trailer (FIG. 1). Tow hitch assembly 170 comprises a sleeve 106; an elongated towing arm 114 connected to sleeve 106; and a radial ball and socket assembly 116 arranged at end 118 of elongated towing arm 114. As shown in FIG. 1, sleeve 106 is connected to a Y-assembly 108 of trailer 30 via bolt assemblies 110, 112 which are received in apertures 120, 122 of sleeve 106 as shown in FIGS. 2 and 3. As best shown in FIG. 3, the radial ball and socket assembly 116 comprises a circular socket 124 with an inner spherical surface 126. Radial ball 128 has an outer spherical surface 130 corresponding to and engaging the inner spherical surface 126 of circular socket 124. It is to be appreciated that the inner spherical surface 126 of circular socket 124 is structured to fixedly retain radial ball 128 therein while allowing radial ball 128 to freely rotate within circular socket 124.

As best shown in FIG. 3, radial ball 128 also has two diametrically opposed flat surfaces 130, 132 and an aperture 134 extending from flat surface 130 to flat surface 132. It is to be appreciated that radial ball 128 is mounted on the upper portion 100 of the elongated kingpin 90 and fixedly secured to the elongated kingpin 90 by the cotter-pin arrangement 104. This is achieved by raising elongated towing arm 114 above elongated kingpin 90 such that the aperture 134 of radial ball 128 is aligned with upper portion 100 of kingpin 90 and then elongated towing arm 114 is lowered such that upper portion 100 of kingpin 90 is received in aperture 134 of radial ball. Once this is done, leg 103 of cotter-pin arrangement 104 is inserted into aperture 102 of kingpin 90 and hoop 105 of cotter-pin arrangement 104 is swiveled downwardly to secure cotter-pin arrangement 104 in aperture 102 of kingpin 90. In effect, radial ball and socket assembly 116 with elongated towing arm of tow hitch assembly 170 is attached to yoke assembly 50 connected to motorcycle 20.

In order to release tow hitch assembly 170 from yoke assembly 50, cotter-pin arrangement 104 is removed from aperture 102 of elongated kingpin. Elongated towing arm 114 is raised high enough such that radial ball 128 clears upper portion 100 of elongated kingpin 90 and elongated towing arm 114 of tow hitch assembly 170 may be placed on the ground. This construction of the invention is such that tow hitch assembly 170 can be attached and detached easily relative to the motorcycle by only one person.

The outer spherical surface of radial ball 128 engages the inner spherical surface 126 of circular socket 124 of the elongated towing arm 114. This rotational movement of radial ball 128 allows free movement of the motorcycle in various planes while maintaining the elongated towing arm and the trailer in a fixed plane. That is, when the motorcycle 20 is pivoted or leaning from one side to the other, radial ball 128 is moved with the movement of the motorcycle while the elongated towing arm 114 remains in a fixed horizontal position relative to the ground or road.

Figure 5:
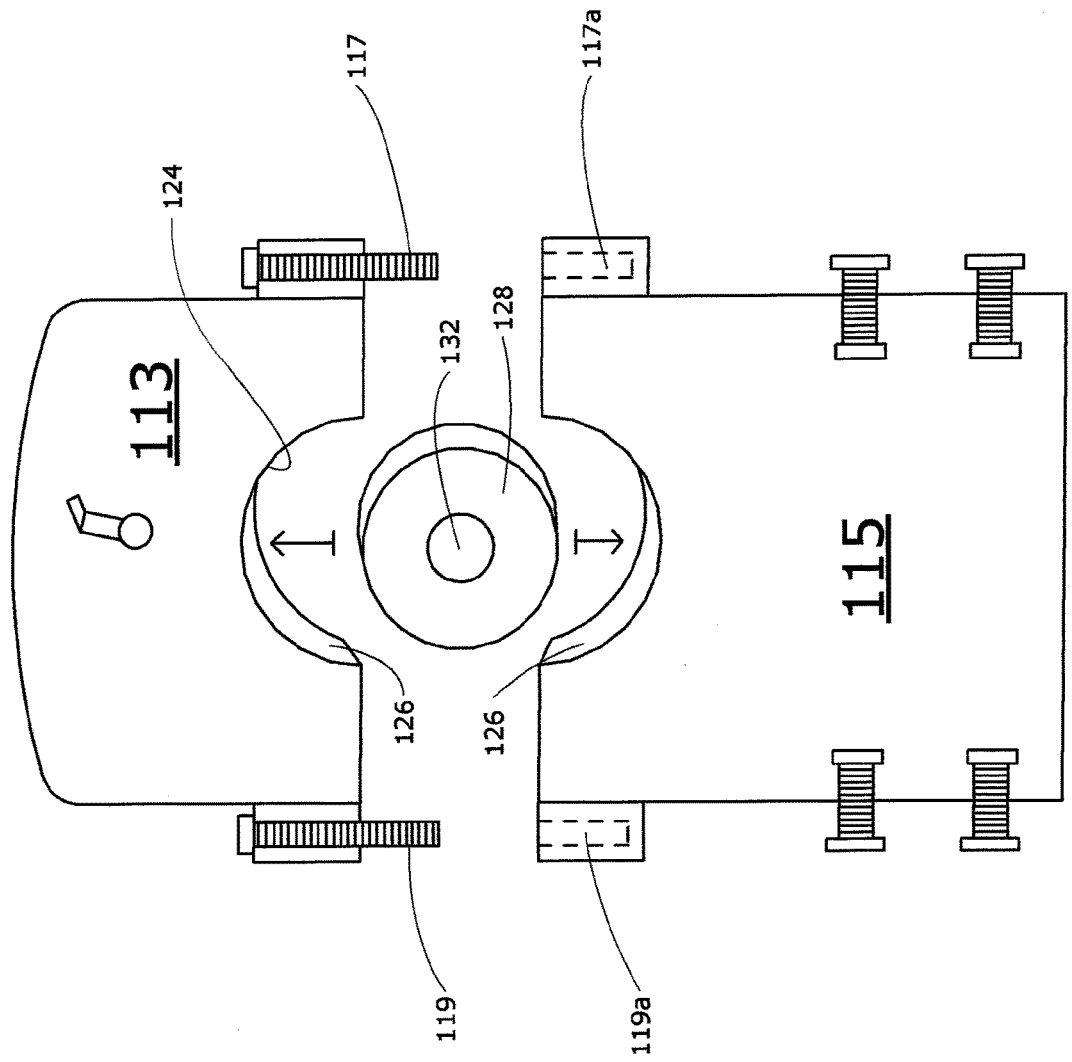
FIG. 5 is an enlarged, schematic, exploded top view of a second embodiment for the elongated towing arm of the tow hitch assembly of the invention with a circular aperture retaining a radial spherical ball.

As best shown in FIG. 5, the end of elongated towing arm 114 is comprised of two semi-circular members 113 and 115. This construction is better shown in FIG. 5 which show semi-circular member 113 and semi-circular member 115 bolted together by bolts 117 and 119, which are received in apertures 117a, 119a, respectively. As is apparent, semi-circular members 113 and 115 form circular socket 124 for rotatably supporting radial ball 128.

Figure 4:
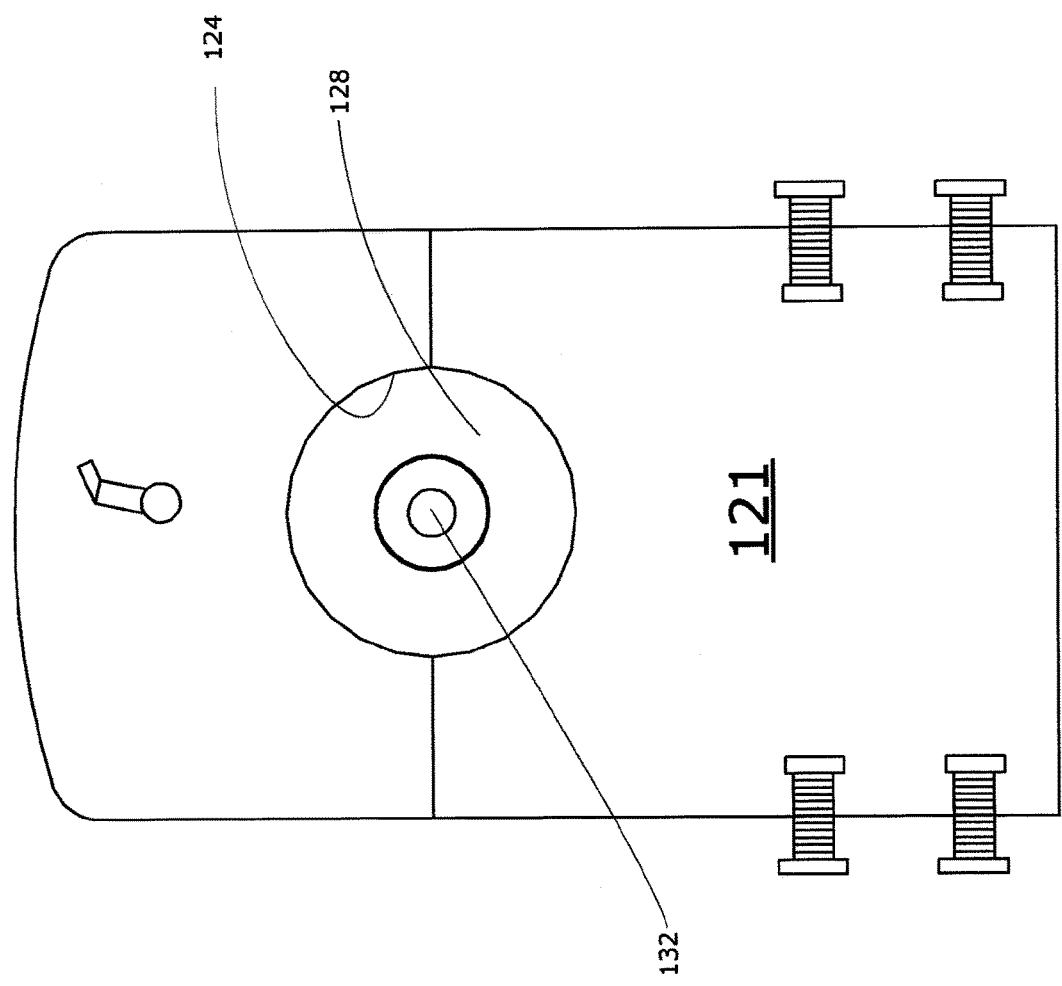
FIG. 4 is an enlarged, schematic top view of a first embodiment for the elongated towing arm of the tow hitch assembly of the invention with a circular aperture retaining a radial spherical ball.

FIG. 4 illustrates a further embodiment of the invention. As shown, the end of elongated towing arm 114 is comprised of one member 121 having circular socket 124 for rotatably supporting radial ball 128.

While the present invention has been described in connection with the preferred embodiments of the various figures, it is to be understood that other similar embodiments may be used or modifications and additions may be made to the described embodiment for performing the same function of the present invention without deviating there from. Accordingly, it is intended by the appended claims to cover all such changes and modifications to come within the spirit and scope of the invention.

What is claimed is:

1. A motorcycle hitch assembly for connecting a motorcycle to a trailer, comprising:
   a yoke assembly for connecting to the motorcycle, the yoke assembly comprising:
   a mounting plate having an aperture, an upper surface, and a lower surface;
   an elongated kingpin having a first portion with threads and a second portion with an aperture;
   a cotter-pin arrangement received in the aperture of the kingpin;
   a first mounting nut threadably secured to the threads of the first portion of the elongated kingpin and located adjacent to the mounting plate to abut the lower surface of the mounting plate; and
   a second mounting nut threadably secured to the threads of the first portion of the elongated kingpin and located adjacent to the mounting plate to abut the upper surface of the mounting plate;
   the first mounting nut and the second mounting nut arranged to securely affix the elongated kingpin in the mounting plate and to extend the second portion of the elongated kingpin upwardly from the mounting plate; and
   a tow hitch assembly for mounting to the trailer, the tow hitch assembly comprising:
   a sleeve;
   an elongated towing arm connected to the sleeve and having a circular socket with an inner spherical surface;
   a radial ball mounted on the second portion of the elongated kingpin and fixedly secured to the elongated kingpin by the cotter-pin arrangement;
   the radial ball being rotationally supported in the circular socket of the elongated towing arm and having an outer spherical surface corresponding to and engaging the inner spherical surface of the circular socket of the elongated towing arm for rotational movement, the radial ball having a portion of its outer spherical surface projecting outwardly from the circular socket to provide a surface area for the elongated towing arm to pivot about the outer spherical surface of the radial ball to provide as much as 90 degrees of pivoting of the motorcycle in various planes while maintaining the elongated towing arm of the tow hitch assembly and the trailer in a horizontal plane.

2. The motorcycle hitch assembly of claim 1, wherein the cotter-pin arrangement includes a cotter-pin and a semi-circular hoop member for securely locking the radial ball onto the kingpin.

3. The motorcycle hitch assembly of claim 1, wherein the elongated towing arm comprises a one-piece circular member forming the circular socket.

4. The motorcycle hitch assembly of claim 1, wherein the elongated towing arm comprises at least two semi-circular members forming the circular socket.

5. The motorcycle hitch assembly of claim 4, further comprising a plurality of bolts for connecting the two semi-circular members together as a unit.

6. A hitch assembly for connecting a towing vehicle to a towed vehicle, the hitch assembly, comprising:
   a yoke assembly for connecting to the towing vehicle, the yoke assembly comprising:
   an elongated kingpin having an upper portion with an aperture;
   a cotter-pin arrangement received in the aperture of the kingpin; and
   a tow hitch assembly for mounting to the towed vehicle, the tow hitch assembly comprising:
   an elongated towing arm having a circular socket with an inner spherical surface;
   a radial ball mounted on the elongated kingpin of the yoke assembly and fixedly secured to the elongated kingpin by the cotter-pin arrangement;
   the radial ball being rotationally supported in the circular socket of the elongated towing arm and having an outer spherical surface engaging the inner spherical surface of the circular socket of the elongated towing arm, the radial ball having a portion of its outer spherical surface projecting outwardly from the circular socket to provide a surface area for the elongated towing arm of the tow hitch assembly to pivot about the outer spherical surface of the radial ball to provide as much as 90 degrees of pivoting of the towing vehicle in various planes while maintaining the elongated towing arm of the tow hitch assembly and the towed vehicle in a horizontal plane.

7. The hitch assembly of claim 6, wherein the cotter-pin arrangement includes a cotter-pin and a semi-circular hoop member for securely locking the radial ball onto the kingpin.

8. The hitch assembly of claim 6, wherein the elongated towing arm comprises a one-piece member forming the circular socket.

9. The hitch assembly of claim 6, wherein the elongated towing arm comprises at least two members forming the circular socket.

10. The hitch assembly of claim 9, further comprising a plurality of bolts for connecting the at least two members together as a unit for retaining the radial ball in the circular socket of the elongated towing arm.

11. The hitch assembly of claim 6, wherein the yoke assembly further comprises a nut arrangement for securing the elongated kingpin to the yoke assembly.

12. A motorcycle hitch assembly for connecting a motorcycle to a trailer, comprising:
   a yoke assembly for connecting to the motorcycle and comprising an elongated kingpin; and
   a tow hitch assembly for mounting to the trailer and comprising an elongated towing arm with a ball and socket assembly;
   the ball of the ball and socket assembly having a spherical surface and being supported by the kingpin for rotation in the socket of the ball and socket assembly, the ball having a portion of its spherical surface projecting outwardly from the socket to provide a surface area for the elongated towing arm to pivot about the spherical surface of the ball to provide as much as 90 degrees of pivoting of the motorcycle in various planes while maintaining the elongated towing arm of the tow hitch assembly and the trailer in a horizontal plane.

13. The motorcycle hitch assembly of claim 12, further comprising a nut arrangement for mounting the kingpin to the yoke assembly.

14. The motorcycle hitch assembly of claim 12, wherein the ball has an axial aperture which receives the kingpin for mounting of the ball to the kingpin, and further comprising a cotter pin arrangement having a leg received in the aperture of the kingpin and a hoop for securing the ball to the kingpin.

15. The motorcycle hitch assembly of claim 12, wherein the elongated towing arm of the tow hitch assembly comprises a one piece construction forming the socket of the ball and socket assembly.

16. The motorcycle hitch assembly of claim 12, wherein the elongated towing arm of the tow hitch assembly comprises a two-piece construction forming the socket of the ball and socket assembly.

\* \* \* \* \*